No. 673,958. Patented May 14, 1901.
C. LANGGUTH.
MEDICINE SPOON.
(Application filed Nov. 12, 1900.)
(No Model.)
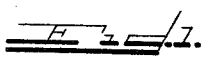
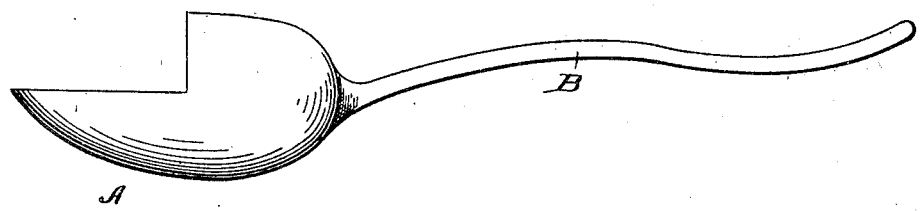
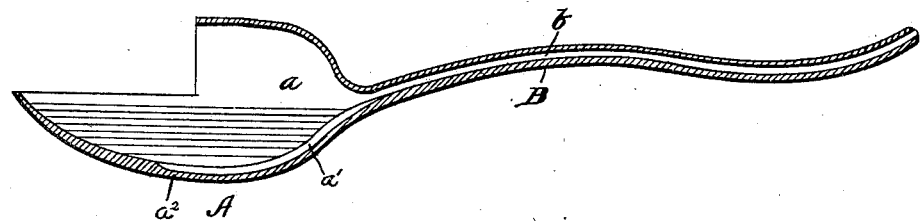
Witnesses
Ira D. Perry
Inventor
Charles Langguth
by Chas. G. Page Atty

UNITED STATES PATENT OFFICE.

CHARLES LANGGUTH, OF CHICAGO, ILLINOIS, ASSIGNOR OF ONE-HALF TO JOHN W. ADAMS, OF SAME PLACE.

MEDICINE-SPOON.

SPECIFICATION forming part of Letters Patent No. 673,958, dated May 14, 1901.

Application filed November 12, 1900. Serial No. 36,245. (No model.)

*To all whom it may concern:*

Be it known that I, CHARLES LANGGUTH, a citizen of the United States, residing at Chicago, county of Cook, State of Illinois, have invented a certain new and useful Improvement in Medicine-Spoons, of which the following is a specification.

Objects of my invention are to provide a simple and economical construction of spoon which can be made entirely of glass, to permit the spoon to be quickly and readily used without spilling the fluid contents of the bowl, and to provide improved means for draining the bowl, particularly where a small quantity of fluid is used or at the terminal portion of the discharge of any desired quantity of fluid through the handle.

In the accompanying drawings, Figure 1 represents my improved medicine-spoon in side elevation. Fig. 2 is a section taken centrally and longitudinally through Fig. 1.

The spoon comprises an ovate or substantially ovate bowl A, having at one end a handle B, which can be taken hold of by the user for the purpose of manipulating the spoon. A part of the upper forward end portion of the ovate bowl is removed, so as to permit access to be had to the bowl and allow the same to be filled to any suitable extent either by dropping or otherwise running a fluid or fluid mixture into the bowl or by scooping up such fluid or the like where circumstances may admit of such manipulation. As a simple and preferred form the absent portion of the ovate bowl may be said to be the result of removing from a bowl of substantially ovid form a part of substantially its upper forward half, the removal being on planes at right angles to each other, with the one transverse and perpendicular the length of the bowl and the other coincident or parallel with such length, it being understood, however, that the spoon is in the first instance made with a part of its upper forward portion absent, substantially as illustrated. The rear or handle end portion of the ovate bowl back of its open forward end portion forms a chamber $a$, adapted to receive and contain the fluid contents of the bowl when the spoon is tilted in a direction to depress its handle, which latter is provided with a discharge-duct formed by a bore $b$, extending longitudinally through the handle from end to end thereof and opening into the bowl-chamber $a$. The walls of the bowl-chamber contract toward the handle, whereby the chamber contracts toward and merges into the handle-duct. When, therefore, the handle is tilted downwardly, the fluid contents of the bowl will be received within the chamber and directed to and discharged by the handle-duct. During the operation of thus emptying the bowl the fluid contents thereof will not spill out even if the spoon is brought into a vertical position, since the act of thus tilting the spoon will cause the liquid to flow into the chamber at its handle end. With a spoon of this construction an operator administering medicine to a patient occupying a recumbent position can, if desired, grasp the handle and by temporarily closing the outlet end of the handle-duct with one finger tilt up the bowl to any desired angle before permitting the discharge from the handle and without spilling the contents of the bowl. The duct provided by a bore through the handle is extended within the bowl by an open drain-channel $a'$, extending forwardly from the handle-duct to about the middle or forward of the middle of the bowl and formed in the inner side of the lower half $a^2$ of the bowl. This channel assists in draining the bowl and preferably extends somewhat forward of the chamber $a$, a particular advantage of such drain-channel being its service during the terminal portion of the operation of discharging the fluid contents of the bowl and the fact that its construction permits the spoon to be made of glass. The lower half or portion of the bowl can be graduated in any desired way by longitudinally-arranged graduation-marks.

What I claim as my invention is—

A medicine-spoon comprising a substantially ovate bowl provided with a handle at one end, and having an upper part of its opposite end portion removed, and forming back of such removed part a chamber which is adapted to receive the fluid contents of the lower portion of the bowl, and contracted toward and merged into a discharge-duct formed by a bore extending longitudinally through the handle and opening into said chamber; the discharge-duct thus provided through the handle being extended within the bowl by an open channel formed in the inner side of the lower portion of the ovate bowl, substantially as described.

CHARLES LANGGUTH.

Witnesses:
 CHAS. G. PAGE,
 ARTHUR G. OLSEN.